3,073,791
AQUEOUS INTERPOLYMER LATICES COMPRISING FUMARATES, UNSATURATED ACIDS, AND AROMATIC HYDROCARBONS

Mary S. Barkhuff, Springfield, Mass., assignor to Monsanto Chemical Company, St. Louis, Mo., a corporation of Delaware
No Drawing. Filed Feb. 8, 1960, Ser. No. 7,095
7 Claims. (Cl. 260—29.6)

This invention relates to vinylidene polymer latices and more particularly to vinylidene interploymer latices and to a process for their preparation.

The present application is a continuation in part of my application Serial Number 706,565, filed January 2, 1958.

Vinylidene polymer latices have found wide application in the field of coating, particularly in coatings for textile materials, paper and the like. The latices known to date, while useful for the purposes mentioned, nevertheless suffer certain deficiencies. Among these is their proneness to remain tacky, with the consequence that surfaces prepared from these latices when exposed to dirt, dust and other foreign substances, as they usually are, will attract these foreign substances. Because of this, both the functionality and the appearance of these prior art latices are adversely affected.

Accordingly, it is a principal object of this invention to provide novel interpolymer latices.

Another object is to provide aqueous vinylidene interpolymer latices which can be dried at room temperatures to exhibit less tackiness than that exhibited by previously known latices of this type.

A further object is to provide processes by which to prepare such latices.

Other objects of the invention will in part be obvious and will in part appear hereinafter.

These and other objects are attained by interpolymerizing as an aqueous emulsion (1) an alkyl ester of fumaric acid, the alcohol radicals of which contain a total of 6–32 carbon atoms (2) at least one unsaturated acid selected from the class consisting of acrylic acid, methacrylic acid, cinnamic acid, atropic acid and crotonic acid (3) a hardening comonomer selected from the class consisting of monovinylidene aromatic hydrocarbons, halogenated derivatives of monovinylidene aromatic hydrocarbons, and alkyl esters of methacrylic acid, the alcohol radicals of which contain 1–3 carbon atoms, and optionally (4) an unsaturated nitrile selected from the class consisting of acrylonitrile and methacrylonitrile and mixtures of the same, wherein a portion of the hardening comonomer is copolymerized with substantially all of the unsaturated nitrile component prior to the addition of the remainder of the monomers.

The following examples are given to illustrate the invention. Where parts are mentioned, unless otherwise described, parts by weight are intended.

Example I

The following charges are prepared by premixing for use in this reaction.

| Kettle charge: | Amounts (grams) |
|---|---|
| Ethylene oxide condensate of octyl phenol | 1.69 |
| Tetrasodiumpyrophosphate | 0.207 |
| Sulfated sodium salt of ethylene oxide condensate of octyl phenol | 1.00 |
| Water | 402.00 |
| Catalyst charge: | |
| $K_2S_2O_8$ (potassium persulfate) | 2.64 |
| Sulfated sodium salt of ethylene oxide condensate of octyl phenol | 10.68 |
| Water | 132.00 |

| Monomer charge I: | Amounts (grams) |
|---|---|
| Styrene | 56.00 |
| Acrylonitrile | 24.00 |
| Monomer charge II: | |
| Styrene | 157.00 |
| Dibutyl fumarate | 157.00 |
| Methacrylic acid | 6.00 |

The kettle charge is added to a 2-liter, 4-neck, round-bottom flask which is fitted with a condenser. The charge is heated with agitation to reflux temperature. Monomer charge I is then charged slowly and continuously over a 30-minute period to the kettle charge. Thereafter, monomer charge II is charged, again continuously and slowly, over a 50-minute period. During the entire monomer addition period, involving an elapsed time of about 80 minutes, the catalyst charge is simultaneously charged slowly and continuously. The reaction is essentially complete after 200 minutes. After being cooled, neutralized with ammonium hydroxide and filtered through cheesecloth, the reaction product is a milky white liquid interpolymer latex.

In order to illustrate the tackiness characteristics, and more properly the lack of same, of the latex produced above, a portion between 1–2 ml. of the same is coated onto one surface of a clean glass plate using a 1 mil doctor blade. The assembly is left to dry at room temperature for a period of 1 hour. The film obtained is clear and grain-free. A strip 1 inch x 3 inches in area of paper tissue (facial cleansing grade) is placed on the film, and a 500 gram weight is in turn placed on the tissue. After 1 minute, the weight is removed and the tissue separated from the film by pulling gently in a horizontal direction. In doing so, no resistance to movement of the tissue can be noted and neither does the film exhibit any fibers retained from the tissue. Prior art latices subjected to the same test conditions exhibit considerably more resistance to removal of the tissue and accordingly exhibit tackiness.

The following examples are carried out to illustrate that variations as to components are in accordance with this disclosure:

Example II

| Premixed monomer charges: | Amounts (grams) |
|---|---|
| Monomer charge I— | |
| Styrene | 80.00 |
| Monomer charge II— | |
| Styrene | 126.00 |
| Dibutyl fumarate | 188.00 |
| Methacrylic acid | 6.00 |

Example III

| Premixed monomer charges: | |
|---|---|
| Monomer charge I— | |
| Styrene | 112.00 |
| Acrylonitrile | 48.00 |
| Monomer charge II— | |
| Styrene | 60.00 |
| Dibutyl fumarate | 94.00 |
| Methacrylic acid | 6.00 |

Example IV

| Premixed monomer charges: | |
|---|---|
| Monomer charge I— | |
| Styrene | 160.00 |
| Monomer charge II— | |
| Styrene | 60.00 |
| Dibutyl fumarate | 94.00 |
| Methacrylic acid | 6.00 |

Example V

Premixed monomer charges:
- Monomer charge I—
  - Styrene _____ 56.00
  - Acrylonitrile _____ 24.00
- Monomer charge II—
  - Styrene _____ 126.00
  - Dibutyl fumarate_____ 188.00
  - Methacrylic acid_____ 6.00

Example VI

Premixed monomer charges:
- Monomer charge I—
  - Styrene _____ 160.00
- Monomer charge II—
  - Styrene _____ 60.00
  - Butyl octyl fumarate_____ 94.00
  - Methacrylic acid_____ 6.00

Example VII

Premixed monomer charges:
- Monomer charge I—
  - Styrene _____ 80.00
- Monomer charge II—
  - Styrene _____ 157.00
  - Dioctyl fumarate_____ 157.00
  - Methacrylic acid_____ 6.00

Example VIII

Premixed monomer charges:
- Monomer charge I—
  - Styrene _____ 56.00
  - Acrylonitrile _____ 24.00
- Monomer charge II—
  - Styrene _____ 126.00
  - Ethyl butyl fumarate_____ 188.00
  - Methacrylic acid_____ 6.00

In each of the foregoing Examples II–VIII, the procedure set forth in Example I is followed. The latices produced in each example give clear films on being dried at room temperature and evidence neither grainy nor tacky characteristics. When subjected to the tests set forth in Example I, these latices meet substantially the same standard of performance as to minimum tackiness as the latex of Example I.

The latices of this invention are obtained from interpolymerization as an aqueous emulsion (1) and alkyl ester of fumaric acid the alcohol radicals of which contain a total of 6–32 carbon atoms (2) at least one unsaturated acid selected from the group consisting of acrylic acid, methacrylic acid, cinnamic acid, atropic acid and crotonic acid (3) at least one hardening comonomer selected from the group consisting of monovinylidene aromatic hydrocarbon, halogenated derivatives of monovinylidene aromatic hydrocarbons, and alkyl esters of methacrylic acid, the alcohol radicals of which contain 1–3 carbon atoms and optionally (4) an unsaturated nitrile of the group consisting of acrylonitrile and methacrylonitrile and mixtures of the same.

The alkyl esters of fumaric acid presently intended are those having alcohol radicals which contain a total of 6–32 carbon atoms. In that fumaric acid is a dibasic acid, monoalkyl fumarates and dialkyl fumarates can be had through esterification of fumaric acid and either type can be used in practice of the present invention. The total carbon atoms of the alkyl alcoholic radicals of any given fumaric acid ester or fumarate can be contained in a (a) single alkyl radical when a monalkyl fumarate is used, and (b) two alkyl radicals when the dialkyl fumarates are used. Accordingly, the proposition can also be expressed as including esters of fumaric acid, the alcohol moiety of which is made up of the radicals, $R_1$ and $R_2$, where $R_1$ and $R_2$ are hydrogen or alkyl radicals, and at least one of which must be an alkyl radical, the total carbon atoms contained in the said radicals being 6–32. Preference is directed to dialkyl fumarates or those fumarates in which both radicals $R_1$ and $R_2$ represent alkyl radicals. The alkyl radicals are saturated alkyl radicals. Examples of the intended fumarates are dibutyl fumarate, butyl octyl fumarate, dioctyl fumarate, methyl decyl fumarate, methyl octadecyl fumarate, didecyl fumarate, di-2-ethylhexyl fumarate, dihexadecyl fumarate, etc. Dibutyl fumarate is the preferred fumaric acid ester. Mixtures of two or more such esters may be used if desired. The amount of fumarate to be used ranges between about 12–58% by weight of the total monomer charge, with preference directed to about 35–45% by weight of the total monomer charge. The fumarate constituency of the interpolymer product which results will also bear substantially the same weight percentages, i.e., weight percent of fumarate in total monomer charge equals substantially that of fumarate in the resulting interpolymer.

The prescribed unsaturated acid is a member of the group consisting of acrylic acid, methacrylic acid, cinnamic acid, atropic acid and crotonic acid, either of the first two mentioned being preferred. Mixtures of two or more such acids may be used if desired. The unsaturated acid constitutes about 1–5% by weight of the total monomer charge and in turn reflects the weight percentage of this component in the interpolymer produced. Preference is directed to the use of about 1–3% by weight of the unsaturated acid.

The hardening comonomer to be used can be selected from the group consisting of monovinylidene aromatic hydrocarbons, halogenated derivatives of monovinylidene aromatic hydrocarbons, and esters of methacrylic acid, the alcohol radical of which contains 1–3 carbon atoms. Suitable monovinylidene aromatic compounds include styrene, alpha-methyl styrene, alpha-methyl-p-methyl styrene, p-methyl styrene, m-ethyl styrene, p-isopropyl styrene, p-chloro styrene, 2,4-dichloro styrene, 2,5-dichloro styrene, p-bromo styrene, vinyl naphthalene, etc. of the monovinylidene aromatic compounds, styrene is preferred. The desired esters of methacrylic acid are the saturated alkyl esters of methacrylic acid. These include the methyl, ethyl and propyl esters of methacrylic acid. Mixtures of two or more such compounds may be used if desired. The amounts of hardening comonomer range between about 41–87% by weight of the total monomer charge, and eventually the percent amount of this component in the interpolymer produced. Preference is directed to using hardening comonomer in the amount of about 45–55% by weight of the total monomer charge and reflecting its presence in the interpolymer produced.

The unsaturated nitrile which can be included can be either acrylonitrile or methacrylonitrile or mixtures of these two. The preferred amounts of this component to be used are between about 3–20% by weight of the total monomer charge and eventually the interpolymer, with preference directed about 6–10% by weight. It is to be noted that when the option to include the unsaturated nitrile is exercised that it is in substitution of a corresponding amount of the previously described hardening comonomer. Accordingly, the upper limit as to amount of hardening comonomer on the amount of total monomer charge and eventually interpolymer is then revised to 84% by weight and the lower limit is revised to 38% when the option to include the nitrile is so exercised. The preferred nitrile is the acrylonitrile. Mixtures of the two nitriles may be used if so desired.

The interpolymer products of this invention can be conveniently visualized as containing a hard core within a soft shell. Considered in this manner, the core size can range from 10–60% on the weight of the interpolymer, while the fumarate in the shell can range from 30–90% of the shell weight.

The desired interpolymer latices are prepared by an aqueous emulsion interpolymerization process carried on in the presence of polymerization catalyst and an emulsifier. The amount of water to be used in the process is preferably varied with the amount of interpolymer or solids content desired for the final latex. Preferably, about 100–250 parts of water are used per 100 parts of monomer mixture to directly produce interpolymer latices having solids content of about 50–30% by weight.

Suitable polymerization catalysts include conventional free-radical generating catalysts or initiators such as potassium persulfate, benzoyl peroxide, lauroyl peroxide, ditertiary butyl peroxide, cumene hydroperoxide, azo-bis-isobutyronitrile, etc. Two or more such catalysts may be used if desired. When the polymerization is conducted at temperatures below reflux, initiators of the redox-type may be used, e.g., potassium persulfate with sodium bisulfite, hydrogen peroxide with ferrous sulfate, hydrogen peroxide with ferric sulfate and sodium pyrophosphate, etc. Usually, about .25–1.25 parts of catalyst or initiator is used per 100 parts of monomer.

The emulsifier may be one or more of a variety of nonionic or anionic emulsifiers. These include salts of high molecular weight fatty acids; more particularly, amine salts and alkali metal salts of rosin acids, alkali metal salts of long-chain alkyl sulfonates and sulfates, ethylene oxide condensates of long-chain fatty acids, alcohols or mercaptans, sodium salts of sulfonated hydrocarbons, sodium salts of aralkyl sulfonates, etc. Particularly useful is a combination of an ethylene oxide condensate of tridecanol or octyl phenol and an alkali metal salt of an aralkyl polyether sulfate, e.g., sodium octyl phenyl polyether sulfate. Usually about 3 parts of emulsifier are used per 100 parts of monomer.

In the featured polymerization process, the ingredients of the polymerization formulation are pre-mixed to form four charges: a kettle charge, catalyst charge, monomer charge I and monomer charge II. The kettle charge comprises a major portion of the water requirement and, optionally, a minor amount of the polymerization catalyst and/or emulsifier. The catalyst charge comprises a minor amount of the water requirement, all or a major portion of the polymerization catalyst, and all or a major portion of the emulsifier. Conventional polymerization aids such as buffers, particle size regulators, activators, etc., may be present in the kettle charge and/or the catalyst charge.

The first monomer charge, or monomer charge I, represents 10–60% by weight of the total monomer charge and consists of a portion of the hardening comonomer and all of the unsaturated nitrile, when the option to include the latter is exercised. Up to 30% of the total weight of the first monomer charge can comprise the unsaturated nitrile. The second monomer charge or monomer charge II comprises the remainder of the monomer charge, that is 90–40% by weight of the total monomer charge. The hardening comonomer contained in the second monomer charge should constitute 20–80% on the total weight of the second monomer charge.

In the polymerization process, the kettle charge is added to a suitable reaction vessel and heated to polymerization temperature accompanied by agitation. The polymerization can be conducted at temperatures of about 30–150° C. and can be under sub-atmospheric, atmospheric or superatmospheric pressure, however, the conditions preferred are reflux temperatures, and atmospheric pressure. As a preliminary precaution, the reaction vessel is purged of oxygen by the usual methods, e.g., by flushing with nitrogen, or bringing the kettle charge to reflux temperature.

The catalyst charge is added slowly to the kettle charge maintained at polymerization temperature and with agitation. A period of about 1–2 hours and preferably a period of about 80 minutes is required for the catalyst addition. The first monomer, monomer charge I, is slowly added during the first part of the period of catalyst addition, preferably a period of about 30 minutes elapsing and the second monomer charge, monomer charge II, is slowly added during the remainder of the period, preferably about 50 minutes being required for the same. The first monomer charge should be essentially reacted or interpolymerized prior to of the second monomer charge. Reaction or interpolymerization of greater than about 70% of the monomers of monomer charge I prior to the addition of the second monomer charge is accordingly prescribed. Interpolymerization of the monomers can also be described as paralleling addition of same to the kettle charge. After the monomer additions are the prescribed reaction conditions, temperature, etc., are maintained for a period sufficient to give interpolymerization of substantially all of the monomers charged. In this regard, a reaction period totalling about 200 minutes (including both monomer charging periods) will give excellent results, both as to the constituencies of the interpolymer latices which result and the monomer conversion efficiencies.

The products of this invention are aqueous interpolymer latices, the interpolymer solids having average particle sizes of about .1–2 microns. For the most part the latices can be dried at room temperatures to form continuous films which evidence minimum tackiness. Variations in the monomer preparations and weight ratios of monomer charges can, however, be practiced to yield latices having slightly differing properties, e.g., varying film fusion temperatures, but in which the desirable characteristic of non-tackiness is preserved. Thus, it is possible to provide the subject interpolymer latices with fusing temperatures higher than room temperature. The latices then can be adapted for applications such as in textile finishing. However, the latices which are of particular interest are those which fuse at relatively low temperatures, i.e., room temperature.

Applications for the latices of this invention include use in mineral coating compositions on paper, textile finishing compositions, various surface coating compositions, etc., with particularly high recommendation for their application under conditions in which dust pickup and blocking are to be avoided. They may be compounded with suitable pigments, resinous materials, fillers, thickening agents, stabilizing agents, etc. for use in these applications.

It will thus be seen that the objects set forth above among those made apparent from the preceding descriptions, are efficiently attained and, since certain changes may be made in carrying out the above process and in the interpolymer product set forth without departing from the scope of the invention, it is intended that all matter contained in the above description shall be interpreted as illustrative and not in a limiting sense.

What is claimed is:

1. An emulsion polymerization process for preparing an aqueous latex of an interpolymer which interpolymer comprises (1) about 12–58% by weight of an alkyl ester of fumaric acid the alkyl alcohol radicals of which contain a total of 6–32 carbon atoms, (2) about 1–5% by weight of at least one unsaturated acid of the class consisting of acrylic acid, methacrylic acid, cinnamic acid, atropic acid and crotonic acid, (3) about 40–87% by weight of at least one hardening comonomer of the class consisting of monovinylidene aromatic hydrocarbon, halogenated derivatives of monovinylidene aromatic hydrocarbons, and alkyl esters of methacrylic acid, the alkyl alcohol radical of which contains 1–3 carbon atoms, which comprises slowly and continuously adding an aqueous composition containing a polymerization catalyst and an emulsifier to a kettle charge containing a major portion of the water requirement for said polymerization and being maintained at polymerization temperature, slowly adding with the first portion of the catalyst-emulsifier composition a first monomer charge comprising a portion of the hardening comonomer, said first monomer charge comprising 10–60% by weight of the total monomers, and thereafter slowly adding the remainder of the monomers together with the remainder of the aqueous catalyst-emulsifier composition with polymerization of the monomers contained in each monomer charge substantially paralleling the addition thereof, and maintaining the resultant reaction mixture at polymerization temperature until polymerization is substantially complete.

2. An emulsion polymerization process for preparing an aqueous latex of an interpolymer, said interpolymer comprising (1) about 12–58% by weight of an alkyl ester of fumaric acid, the alkyl alcohol radicals of which contain a total of 6–32 carbon atoms, (2) about 1–5% by weight of at least one unsaturated acid of the class consisting of acrylic acid, methacrylic acid, cinnamic acid, atropic acid and crotonic acid, (3) about 38–84% by weight of at least one hardening comonomer of the class consisting of monovinylidene aromatic hydrocarbon, halogenated derivatives of monovinylidene aromatic hydrocarbons, and an alkyl ester of methacrylic acid, the alkyl radical of which contains 1–3 carbon atoms, and (4) about 3–20% of an unsaturated nitrile of the class consisting of acrylonitrile and methacrylonitrile, which comprises charging an aqueous composition containing a polymerization catalyst and an emulsifier slowly and continuously to a kettle charge containing a major portion of the water requirement for said polymerization and being maintained at polymerization temperature, slowly adding together with the first portion of the aqueous catalyst-emulsifier compositions a first monomer charge comprising a portion of the hardening comonomer and all of the unsaturated nitrile, said unsaturated nitrile comprising not more than 30% by weight of the charge, said first monomer charge comprising 10–60% by weight of the total monomers, then slowly adding the remainder of the monomers together with the remainder of the aqueous initiator-emulsifier composition with polymerization of the monomers contained in each monomer charge substantially paralleling the addition thereof, and maintaining the resultant reaction mixture at polymerization temperature until polymerization is substantially complete.

3. A process as in claim 1 wherein the interpolymer contains about 35–45% by weight of dibutyl fumarate.

4. A process as in claim 1 wherein the interpolymer contains about 1–3% by weight of the unsaturated acid.

5. A process as in claim 1 wherein the interpolymer contains about 45–55% by weight of styrene.

6. A process as in claim 2 wherein the interpolymer contains about 6–10% by weight of acrylonitrile.

7. A latex prepared by the process of claim 1.

References Cited in the file of this patent

UNITED STATES PATENTS

| | | |
|---|---|---|
| 2,462,354 | Brubaker et al. | Feb. 22, 1949 |
| 2,509,857 | Borcherdt et al. | May 30, 1950 |
| 2,544,691 | Kugler et al. | Mar. 13, 1951 |
| 2,767,153 | Sutton | Oct. 16, 1956 |
| 2,851,444 | Wesp et al. | Sept. 9, 1958 |